UNITED STATES PATENT OFFICE.

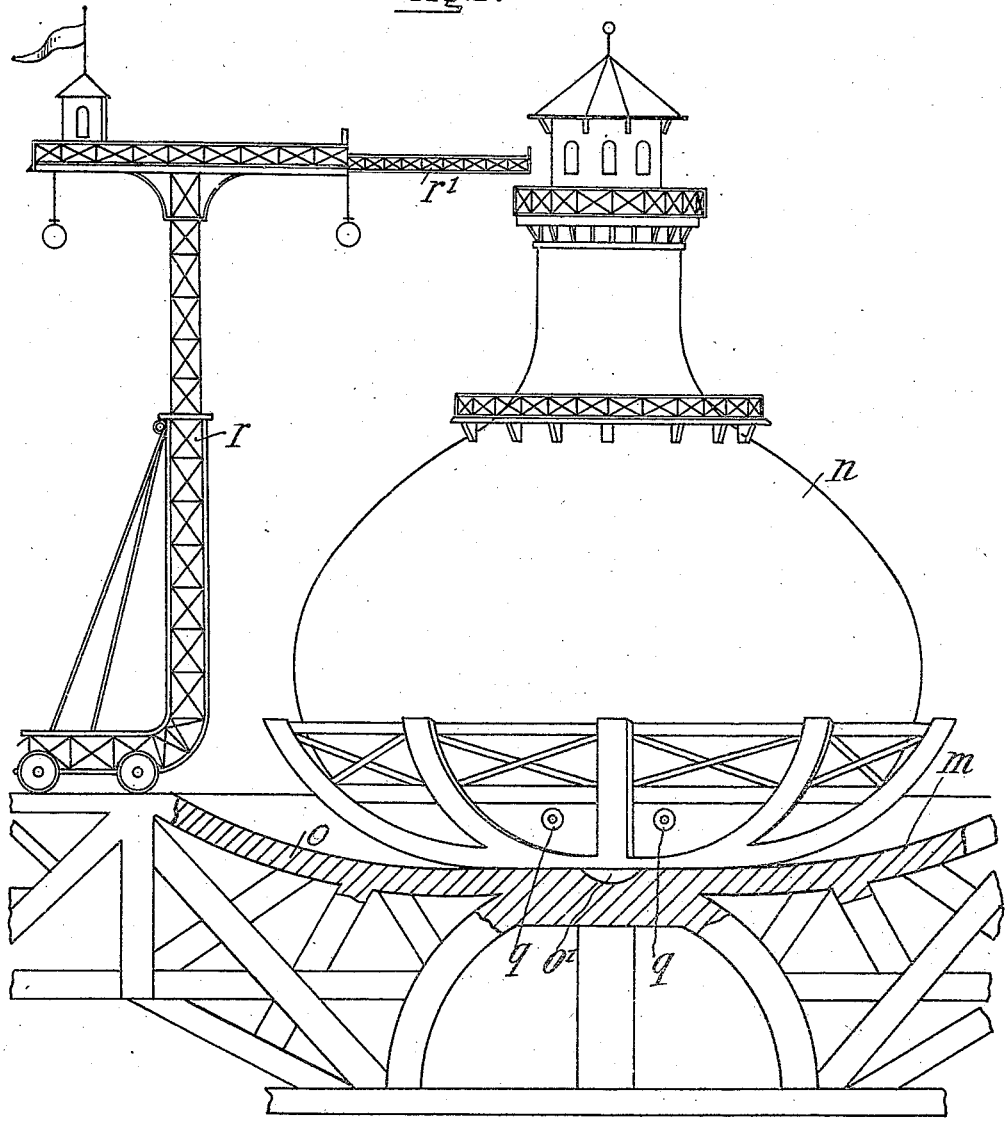

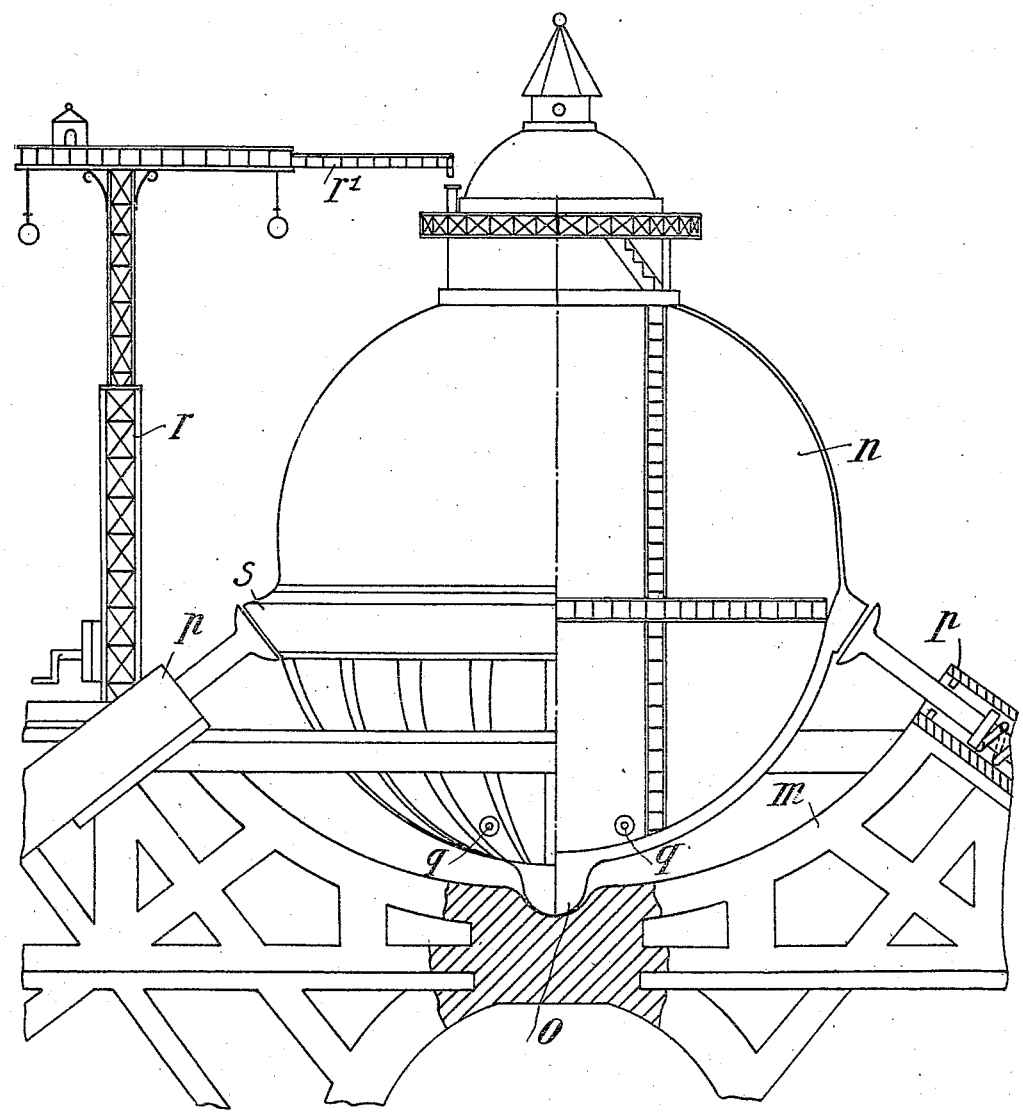

EUGEN BOERMEL, OF BERLIN-GRUNEWALD, GERMANY.

ELEVATED WATER-RESERVOIR.

No. 929,542.  Specification of Letters Patent.  Patented July 27, 1909.

Application filed April 10, 1909. Serial No. 489,190.

*To all whom it may concern:*

Be it known that I, EUGEN BOERMEL, a subject of the King of Prussia, residing at 10 Hagenstrasse, Berlin-Grunewald, Germany, have invented new and useful Improvements in Elevated Water-Reservoirs, of which the following is a specification.

My invention is designed to provide an elevated water reservoir or source of supply capable of withstanding shocks of earthquakes or like disturbances, so as to prevent the loss of water on such occasions when water is so greatly needed. To this end I provide a reservoir or source of supply in the form of a receptacle of any dimension, and support this upon a base upon which the reservoir may rock or oscillate without rupture or destroying the watertight character of the reservoir.

The present invention is an improvement over that for which a patent was granted to me on August 18/08, #896431.

In the accompanying drawing I have illustrated the invention in one form in Figure 1, and in Fig. 2 in another form.

As shown in Fig. 1, I prefer to form the reservoir in the shape of a huge bottle, forming a complete receptacle. I supply this with water in any suitable manner, preferably through conduits discharging the water into the receptacle or reservoir at the upper end and brought into position by the use of an elevated structure, as shown at $r$, which may have means for raising and lowering it, and with extensible sections $r'$ for connecting the conduit with the supply entrance of the reservoir. The reservoir is made with a rounded lower end suitably braced and strengthened, and this rests upon a base having a depressed center as shown at $o$, and the center of gravity is so located that the reservoir may move, rock or oscillate without overturning. It is kept central by a projection $o'$ entering a similar depression in the base. Suitable outlets are provided at $q$.

In Fig. 2 I show a modification or variation in the form of the reservoir, and instead of depending upon gravity to keep the reservoir central I utilize spring buffers $p$, located at different points and adapted to bear normally against a reinforced band $s$ extending around the reservoir slightly below the center thereof.

What I claim is:

1. An earth-quake proof reservoir comprising a vessel having a rounded bottom and a foundation of concave form on which the bottom of the vessel rests, said bottom being hollow, thus adding to the capacity of the vessel, and having a smaller radius than the curvature of the foundation so that said vessel will roll on the foundation upon rocking of the ground.

2. An earth-quake proof reservoir comprising a vessel having a rounded bottom and water outlets in said bottom, said vessel having a central projection on its extreme lower end and a foundation of concave form having a central recess into which the projection enters, said bottom having a smaller radius than the curvature of the foundation so that said vessel will roll on the foundation upon rocking of the ground.

3. An earth-quake proof reservoir comprising a vessel having a rounded bottom and a central projection at its extreme lower end, a reinforced band extending around the vessel slightly below the center thereof, a foundation of concave form having a central depression adapted to receive the projection and spring buffers engaging the reinforced band, said bottom of the vessel having a smaller radius than the curvature of the foundation whereby the vessel will roll on the foundation upon rocking of the ground.

In testimony whereof I have signed my name to this specification in the presence of two subscribing witnesses.

EUGEN BOERMEL.

Witnesses:
 HENRY HASPER,
 WOLDEMAR HAUPT.